United States Patent [19]

Cresap

[11] 4,430,045
[45] Feb. 7, 1984

[54] HELICOPTER POWER TRAIN FOR DISTRIBUTING ROTOR BLADE FLAPPING DISPLACEMENTS THROUGH A PLURALITY OF DRIVE TRAIN COMPONENTS

[75] Inventor: Wesley L. Cresap, Forth Worth, Tex.

[73] Assignee: Bell Helicopter Textron, Inc., Forth Worth, Tex.

[21] Appl. No.: 279,705

[22] Filed: Jul. 2, 1981

Related U.S. Application Data

[63] Continuation of Ser. No. 32,776, Apr. 24, 1979, abandoned.

[51] Int. Cl.$^3$ .............................................. B64C 27/04
[52] U.S. Cl. .................................... 416/138; 416/141; 244/17.27
[58] Field of Search ................ 416/134 A, 141, 138 A, 416/500, 135; 244/17.11, 17.25, 17.27

[56] References Cited

U.S. PATENT DOCUMENTS

| | | | |
|---|---|---|---|
| 2,615,657 | 10/1952 | Young et al. ..................... | 244/17.27 |
| 3,026,942 | 3/1962 | Cresap . | |
| 3,118,504 | 1/1964 | Cresap . | |
| 3,163,378 | 12/1964 | Balke et al. . | |
| 3,193,019 | 7/1965 | Dress et al. . | |
| 3,347,320 | 10/1967 | Cresap et al. . | |
| 3,486,832 | 12/1969 | Stone et al. . | |
| 3,652,185 | 3/1972 | Cresap et al. . | |
| 3,858,831 | 1/1975 | Halwes ............................. | 244/17.27 |
| 3,921,940 | 11/1975 | Mouille ............................ | 244/17.27 |
| 3,926,536 | 12/1975 | Ciastula et al. ............ | 416/138 A X |
| 3,999,887 | 12/1976 | McGuire ........................ | 416/134 A |
| 4,008,980 | 2/1977 | Noehren et al. . | |
| 4,014,484 | 3/1977 | Mouille ............................ | 244/17.27 |
| 4,088,042 | 5/1978 | Desjardins et al. ............. | 416/500 X |
| 4,099,892 | 7/1978 | Martin . | |
| 4,111,386 | 9/1978 | Kenigsberg ..................... | 416/500 X |
| 4,129,403 | 12/1978 | Watson .......................... | 416/134 A |
| 4,135,856 | 1/1979 | McGuire ........................ | 416/134 A |
| 4,236,607 | 12/1980 | Halwes .............................. | 188/379 |
| 4,257,739 | 3/1981 | Covington et al. ........... | 416/134 A |

*Primary Examiner*—Everette A. Powell, Jr.
*Attorney, Agent, or Firm*—Richards, Harris & Medlock

[57] ABSTRACT

A helicopter power train is disclosed in which the rotor tip-path plane (218) inclination relative to the helicopter air frame (200) is achieved by blade flapping motions distributed through a plurality of drive train components rather than through blade flapping motion about a single flap hinge. Rotor tip-path plane flapping is accommodated by resilient transmission mounts (24, 25, 26 and 27) to the extent of approximately 25%, by a flexible mast (208) extending upward from a transmission (11) to the extent of approximately 20%, by a hub (213) having flexure members to the extent of approximately 50% and by flexible blade structure (214, 216) having beam bending to accommodate approximately 5% of the rotor flapping motion. The hub (213) comprises a plurality of yokes (260, 262) each of which is an elongated plate having flexure members to accommodate blade flapping. The yokes (260, 262) are stacked on the mast (208) to form the hub (213).

5 Claims, 9 Drawing Figures

HELICOPTER POWER TRAIN FOR DISTRIBUTING ROTOR BLADE FLAPPING DISPLACEMENTS THROUGH A PLURALITY OF DRIVE TRAIN COMPONENTS

This is a continuation of application Ser. No. 032,776, filed Apr. 24, 1979, now abandoned.

TECHNICAL FIELD

This invention relates to a helicopter power train and more particularly to a power train system for distributing the accommodation of rotor flapping displacements over a plurality of power train components.

BACKGROUND OF THE INVENTION

A helicopter rotor blade undergoes various angular movements when the helicopter is in flight. In certain flight conditions the rotor blade is caused to flap, that is, move vertically, at a periodic rate in its rotation about the mast. Flapping is encountered when the helicopter is in forward motion and is due to the differing relative air velocities across the rotor blades. The flapping action of the rotor blades compensates for the differing lift resulting from air velocities across the blades. Flapping is also induced by the operator cyclic control which produces periodic pitch in the rotor blades to cause a tilting of the blade-tip plane. The various flapping motions of the rotor blades as well as other flexible members of the rotor system establish a composite tip-path plane relative to the helicopter fuselage. In most flight conditions this plane is not parallel to the plane of the airframe therefore means must be provided for accommodating the particular tip-path plane encountered for the flying conditions.

Heretofore, blade flapping has been essentially accommodated by a flap hinge in the rotor hub, the hinge permitted the individual blade segments to translate in a plane parallel to the plane of the rotor mast. The flapping of the blade about this hinge induces substantial moments into the helicopter drive train and these moments in turn induce vibratory forces into the helicopter fuselage. Although certain flapping moments are necessary for proper helicopter control, excessive moments generate undesirable vibrations which are harmful to passengers and increase fatigue load on helicopter components. A flapping hinge creates even further vibratory difficulties when the hinge is spaced at greater distances from the rotor mast.

When the entire blade flapping motion is oriented about a single flap hinge or flexure member, the center of gravity of the blade is periodically moved toward the mast and away from the mast during each rotation of the blade. This action causes the blade to correspondingly speed up and slow down in order to maintain constant angular momentum which results in lead-lag motion of the rotor blades about the blade bolt. This lead-lag motion introduces oscillatory shear forces into the rotor hub and these forces are transmitted as vibrations to the helicopter fuselage. Shear forces of this nature are reduced when the extent of blade flapping about a flap hinge in the rotor hub is lessened.

Therefore, there exists a need for a helicopter drive train which can accommodate blade flapping motion and the moments generated thereby without encountering the excessive moments and vibrations due to blade flapping about a fixed hinge in the rotor hub.

DISCLOSURE OF THE INVENTION

In accordance with the present invention, a helicopter power train is disclosed for accommodating blade deflection produced by blade flapping. The power train includes a transmission coupled by resilient mounts to the fuselage for accommodating about 25% of the tip-path plane flapping motion, a mast extending from the transmission and being flexible to accommodate about 20% of the tip-path plane flapping by mast bending, a yoke secured to the mast for mounting the helicopter blades on the mast wherein the yoke has relative flexibility to accommodate about 50% of the tip-path plane flapping and structure within the blades providing for beam bending to accommodate about 5% of the blade flapping motion.

In accordance with another aspect of the present invention a helicopter rotor hub is provided which comprises a plurality of single plate yoke structures secured to the mast with the yoke structures stacked vertically on the mast. A flexure member is included in the yoke structure to accommodate a portion of the tip-path plane flapping. Means are provided for securing the blade grips to the outboard sections of the yoke structures to permit pitch rotation of the blades while carrying centrifugal and aerodynamic blade loads.

In accordance with a still further aspect of the present invention a mast is provided for transmitting the helicopter drive forces from the transmission to the rotor blades. The mast comprises a flexible, tubular member engaged to the helicopter transmission at the lower end thereof and connected to a yoke at the upper end for driving the rotor blades.

DETAILED DESCRIPTION

FIG. 1

Figure 1:
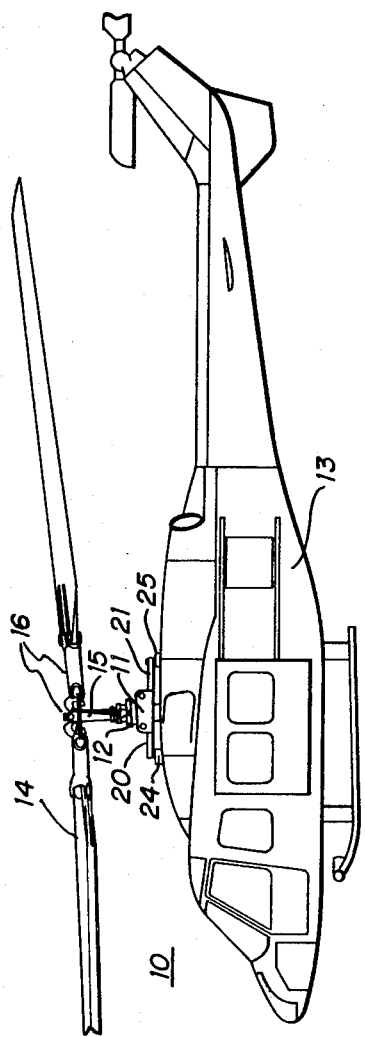
FIG. 1 is a schematic drawing of a helicopter provided with the power train structure of the present invention.

Referring now to FIG. 1, a helicopter 10 has a mounting 11 for a transmission 12 on a fuselage 13. Transmission 12 drives a rotor 14 by way of mast 15. The helicopter pylon including transmission 12 is mounted on resilient supports of predetermined character and operable under all conditions of normal flight. More particularly, the mounting 11 includes a plurality of arms 20 and 21 which are mounted or otherwise coupled to the fuselage 13 by resilient couplings so that the normal fuselage loads experienced during normal flight conditions, including deceleration, are borne by the resilient couplings 24 and 25. Pylon stops are provided to cooperate with arms 20 and 21, respectively, so that in operation under extreme maneuvers, the loads will be borne by the stops, in which case rigid couplings are effective between the pylon and the fuselage.

FIG. 2

Figure 2:
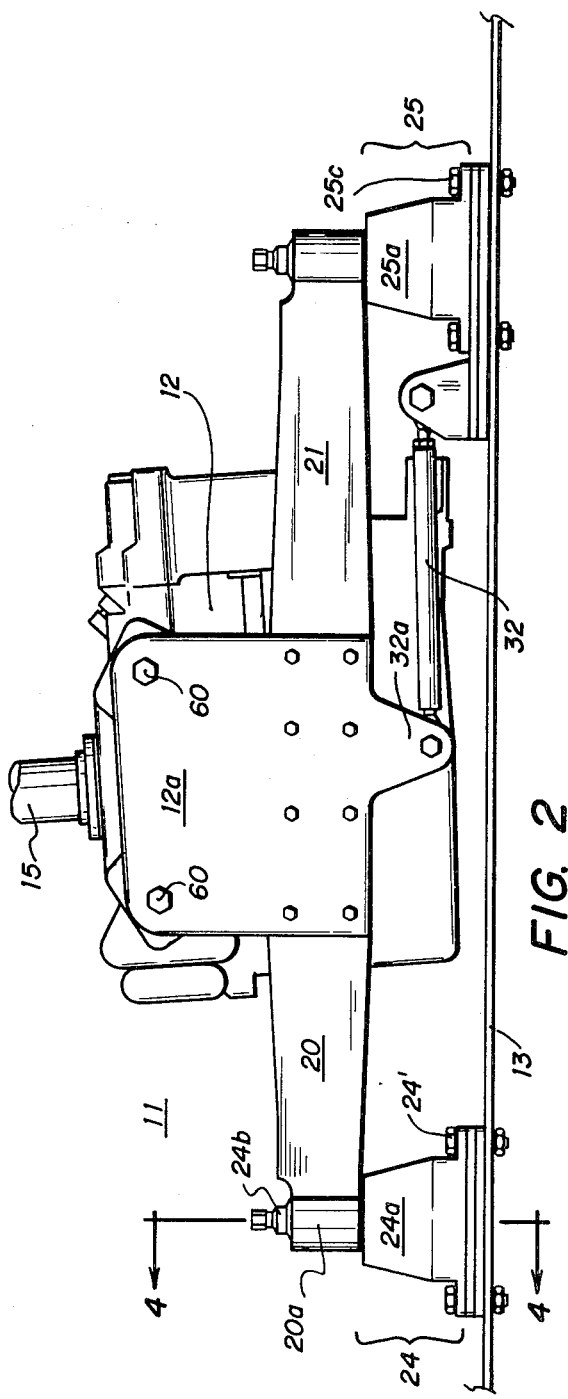
FIG. 2 is a side view of one embodiment of a pylon mounting apparatus.

As shown in FIG. 2, one or more antitorque links 32 may be provided between the transmission 12 and the fuselage 13, to oppose the torque on transmission 12.

A side view of the pylon mounting 11 is shown in FIG. 2. The mount structure includes arms 20 and 21 and plate 12a. These structures are secured to transmission 12 by bolts 60.

Couplings 24, 25 and two additional couplings not shown in FIG. 2 are all similar.

Coupling 24 includes a housing 24a which is secured by bolts 24c, directly and rigidly to the fuselage 13. A bolt 24b is rigidly secured in a hole passing through the end 20a of the arm 20. Bolt 24b extends axially into the housing 24a where it is resiliently mounted as will be shown in FIG. 5.

FIG. 3

Figure 3:
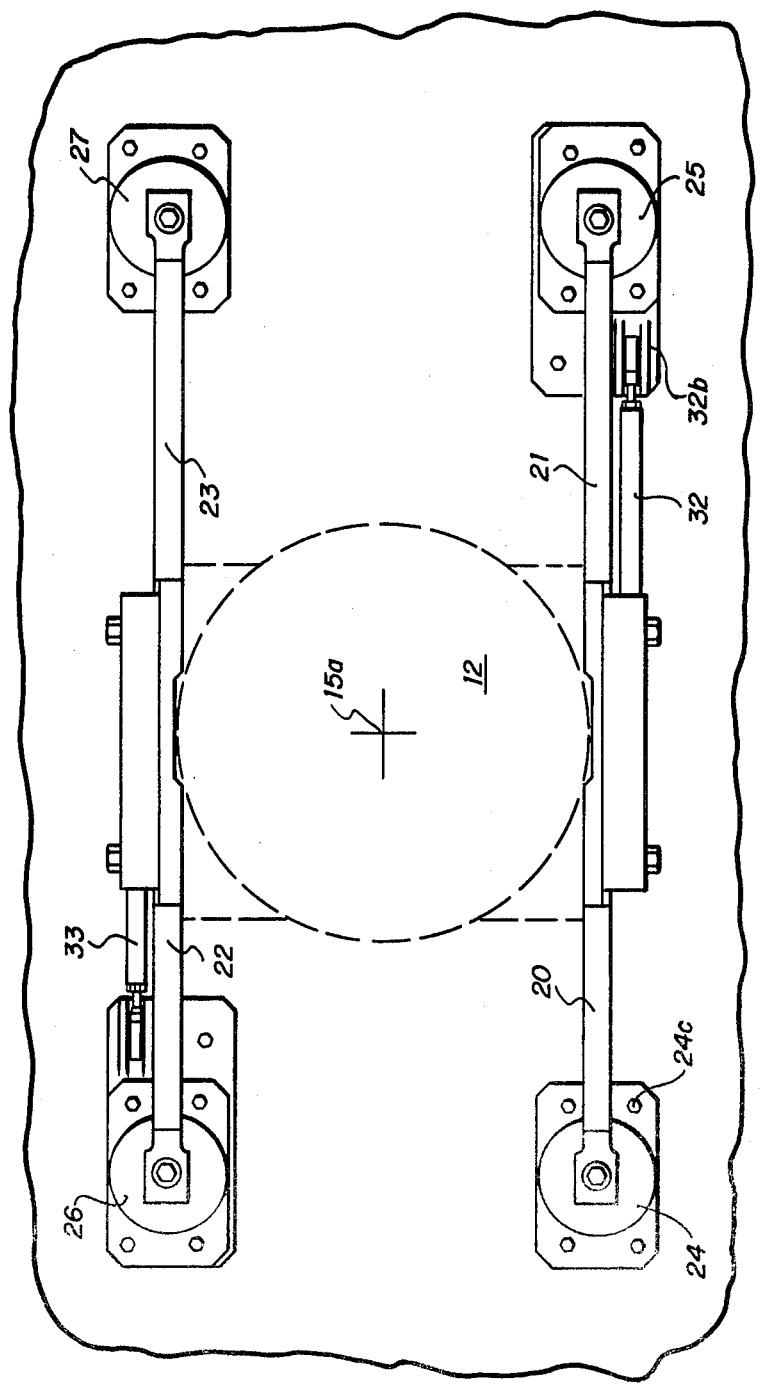
FIG. 3 is a top view of the system of FIG. 2.

FIG. 3 is a plan view of the mounting system of FIG. 2. Arms 20 and 21 are integral one with the other. Arms 22 and 23 are also provided on the side opposite arms 20 and 21. The four 20-23 arms are coupled to the fuselage by four resilient couplings 24-27. Thus, the mounting system is more or less symmetrical about the axis 15a of the mast. The pads 24-27 are mounted to the fuselage by bolts such as bolt 24'. It will be noted that two antitorque links 32 and 33 are provided. Link 32 is coupled to tab 32a (FIG. 2) on plate 12a and to a pivotal link 32b on the mounting plate of coupling 25. It may also be noted that the pylon torque may be reacted without the use of the antitorque links 32 and 33 by means of side forces on the couplings 24-27, if they are sized properly for this load in addition to the fundamental vertical load.

FIG. 4

Figure 4:
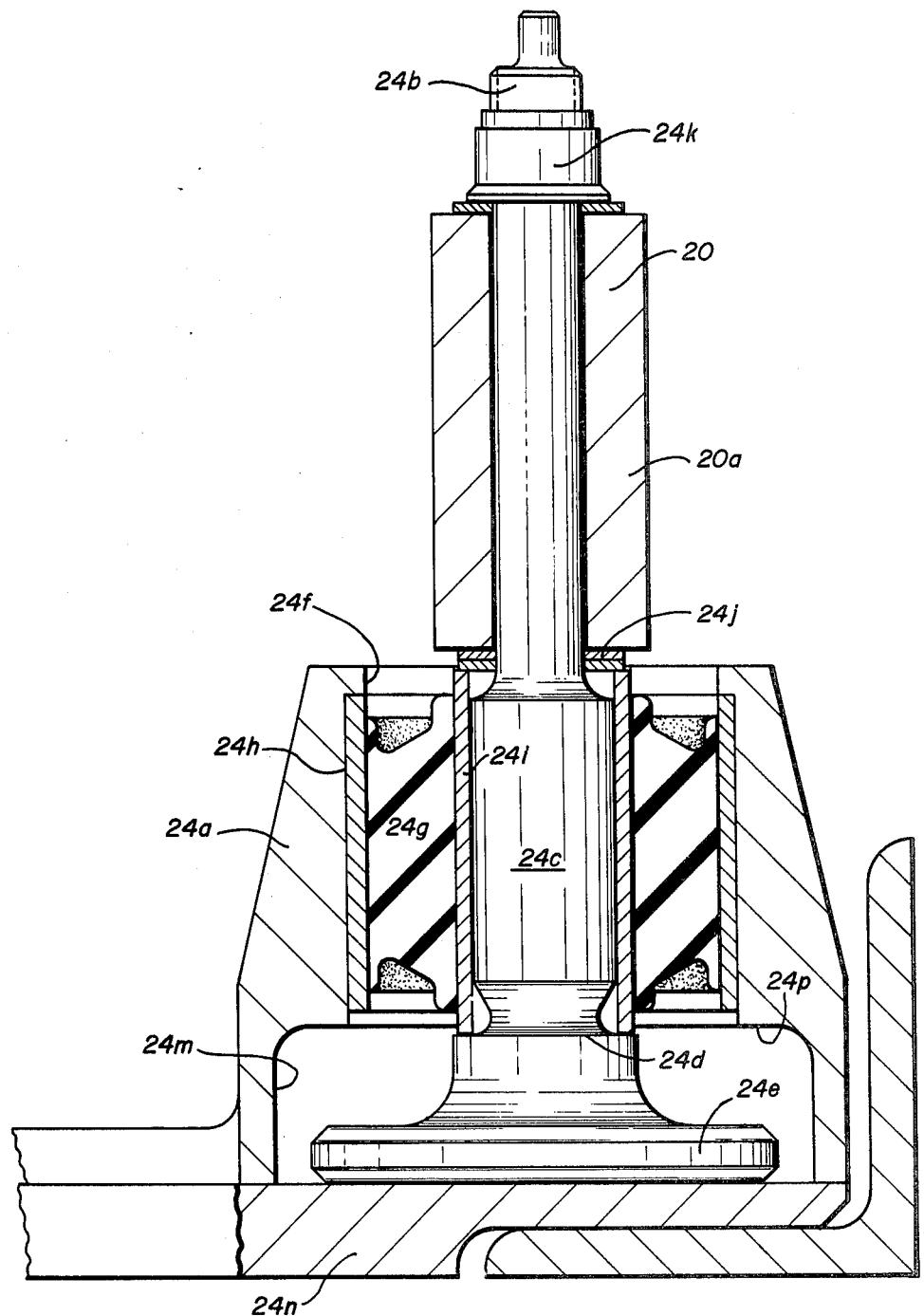
FIG. 4 is a detailed sectional view taken along lines 4—4 of FIG. 2.

FIG. 4 illustrates a sectional view of the mounting taken along lines 4—4 in FIG. 2 at the end of arm 20. Both 24b is shown extending above the top of the arm 20 and is of small diameter. Bolt 24b has a lower portion 24c of enlarged diameter below which there is provided still a larger diameter shoulder 24d. Below shoulder 24d is a disc-like foot 24e.

The housing 24a has a central bore 24f of cylindrical shape to which an elastomeric bushing 24g is secured. Bushing 24g includes an outer cylinder 24h which is rigidly and securely coupled to housing 24a. It also includes an inner cylinder 24i which is secured to the outer cylinder 24h by the resilient elastomeric body 24g. The lower end of cylinder 24i rests on shoulder 24d and mates with the enlarged section 24c of bolt 24b. The upper end of cylinder 24i bears against washers 24j which in turn bear and are forced against the bottom of the enlarged end portion 20a of arm 20. A nut 24k is served onto the upper end of bolt 24b to rigidly secure bolt 24b within the inner cylinder 24i.

The bore 24f has a reentrant portion 24m which is somewhat larger than the diameter of the disc 24e. The mounting plate 24n of the coupling 24 is secured to the lower end of housing 24a and forms a closure therefor with its surface forming a base on which the disc 24e may rest. Mounting plate 24n is rigidly attached to fuselage 13. When the helicopter is at rest on the ground, the weight of the pylon and rotor is transmitted from disc 24e to the mounting plate 24n. Thus, the standing load of the rotor system is rigidly supported. In normal flight, the disc 24e raises off of the base plate 24n and operates freely and resiliently between the upper surface of the plate 24n and the lower down facing shoulder 24p allowing the pylon freedom to tilt to a limited degree relative to the helicopter fuselage structure.

In one embodiment of the invention, the preferred system was employed on a Bell Helicopter aircraft, Model No. 206L-M, wherein the gross weight was approximately 4000 pounds. Four mountings such as mounting 24 equally shared the load. The elastomeric body 24g was about 1 inch inside diameter, about 2.75 inches outside diameter, about 2.2 inches in length, and had a spring rate of 1800 pounds per inch.

FIG. 5

Figure 5:
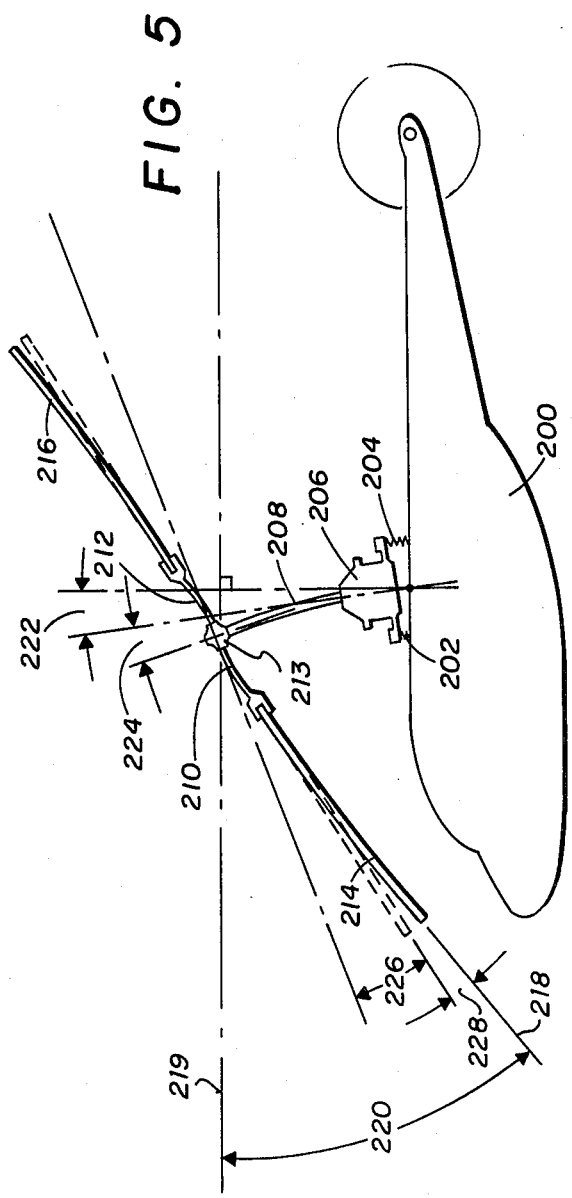
FIG. 5 is a schematic illustration of a helicopter showing the accommodation of blade flapping forces along a series of power train components.

A schematic illustration of a helicopter 200 and the drive system therefor is shown in FIG. 5. The drive system comprises resilient transmission mounts 202 and 204, transmission 206, mast 208, yokes 210 and 212 of hub 213 together with blades 214 and 216.

As shown in FIG. 5 the rotor blades 214 and 216 are undergoing a cyclic control command to tilt the rotor blade tip-path plane for forward flight. The overall angle of the tip-path plane 218 relative to the nontilted plane 219 of the rotor is angle 220. This angle which is the total rotor-flapping requirement is made up of a plurality of angles contributed by the components of the helicopter drive train. Angle 222 is due to the action of the resilient transmission mounts 202 and 204. The bending of mast 208 generates angle 224 and the flexing of yokes 210 and 212 is shown by angle 226. Finally, the beam bending of blades 214 and 216 contributes the angle 228. Thus, angle 220 is the summation of angles 222, 224, 226 and 228.

The contributions of the various angles toward the overall deflection angle of the tip-path plane are shown in Table 1 as percentage ranges and as a preferred percentage.

TABLE 1

| Component | Accommodation Range | Preferred Accommodation |
|---|---|---|
| Transmission Mount (Angle 222) | 15-35% | 25% |
| Flexible Mast (Angle 224) | 10-30% | 20% |
| Yoke Flexure (Angle 226) | 40-60% | 50% |
| Blade Structure (Angle 228) | 0-10% | 5% |

The rotor blades in FIG. 5 are shown as oriented for forward flight, however, the rotor blade can be tilted to any other angle as required by flight conditions and the ratio of angle contributions by the various drive train components remains essentially the same.

FIG. 6

Figure 6:
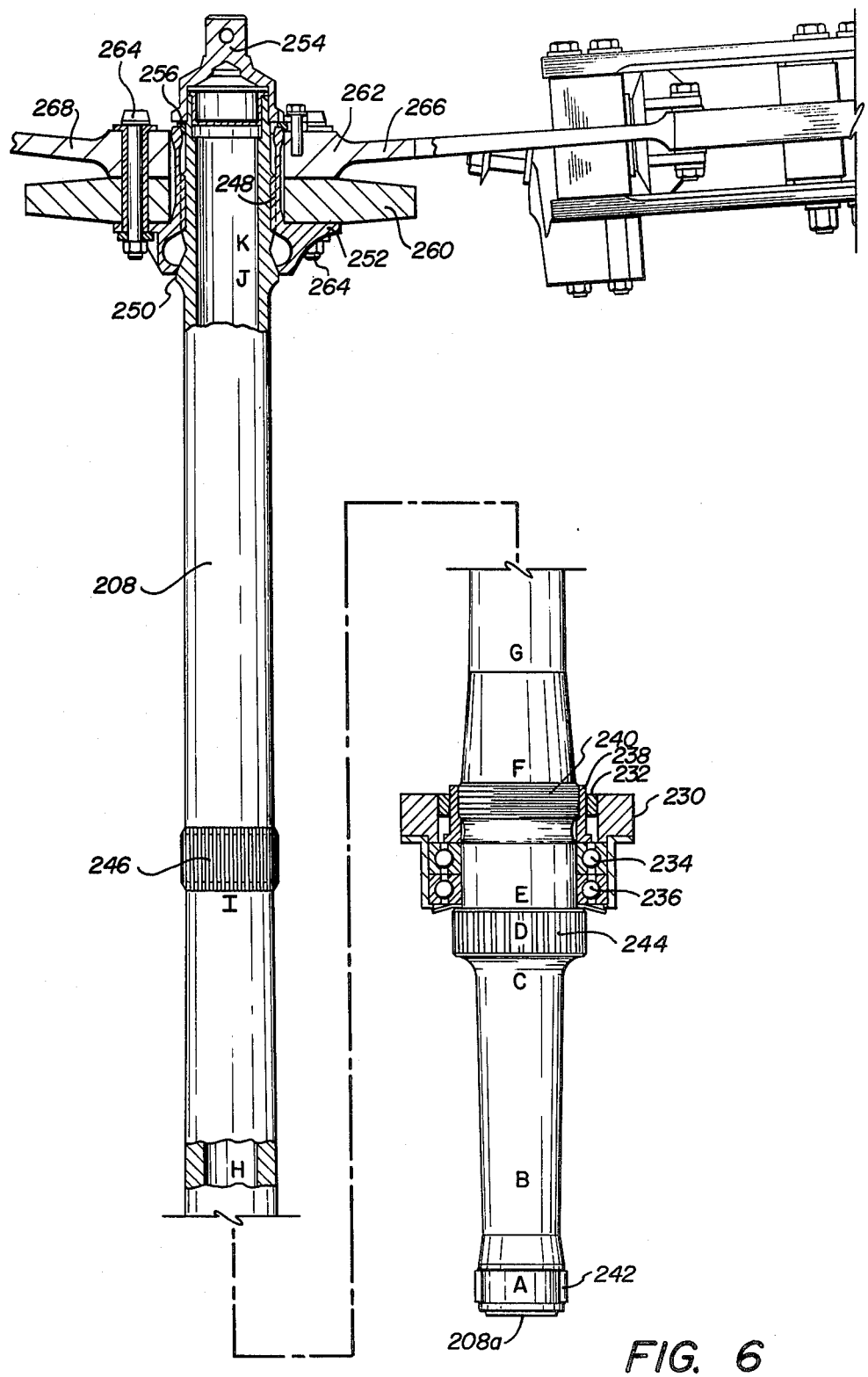
FIG. 6 is an elevation view, partially sectioned, of a flexible mast in accordance with the present invention.

The flexible mast 208 and the related yoke components are illustrated in detail in FIG. 6. Mast 208 extends through a transmission housing 230 where it is supported be bearings 234 and 236 and seal 232. The bearings 234 and 236 are retained to mast 208 by means of a nut 238 which engages threads 240 on mast 208. Mast 208 extends through transmission housing 230 downward to a bottom end 208a which is nested in a roller bearing 242.

In the region of the transmission housing, mast 208 has a tapered external diameter in which region the mast 208 is provided with threads 240. Immediately below bearing 236 mast 208 is provided with an integral drive gear 244 which receives the rotor drive power from the helicopter transmission. The external diameter of the mast 208 tapers inward from drive gear 244 toward the lower end of the mast at 208a.

Mast 208 has station locations A-K marked thereon in FIG. 6. The parameters of the mast at these station locations are given in the following table in which all dimensions are in inches:

TABLE 2

| Station | Outside Diameter | Inside Diameter | Distance From Bottom of Mast |
| --- | --- | --- | --- |
| A | 2.067 | 1.400 | .715 |
| B | 1.890 | 1.400 | 1.913 |
| C | 2.120 | 1.400 | 8.227 |
| D | 3.250 | 1.400 | 9.197 |
| E | 2.756 | 1.400 | 9.767 |
| F | 2.670 | 1.400 | 12.967 |
| G | 2.249 | 1.400 | 15.607 |
| H | 2.150 | 1.500 | 18.567 |
| I | 2.150 | 1.500 | 25.930 |
| J | 2.500 | 1.500 | 41.047 |
| K | 2.059 | 1.500 | 41.447 |

The mast 208 includes a set of splines 246 which provide for the mounting of a swash plate driver (not shown). Near the top of mast 208 there are provided splines 248. Immediately below the splines 248 there is formed on mast 208 a conical mounting ring 250. An adapter 252 is secured to the upper end of mast 208 by a mast nut 254 which forces a cone set ring 256 down between the upper end of mast 208 and the inner surface of adapter 252.

A pair of yoke assemblies 260 and 262 are mounted on adapter 252 and are rigidly secured to one another at right angles by bolts 264. In practice eight such bolts are employed. The yoke assemblies 260 and 262 each include the yokes 210 and 212 shown schematically in FIG. 5.

Four blades are to be mounted on grips joined to the yoke assemblies 260 and 262, one blade connected to each end of each yoke assembly. Each of the yoke assemblies is equipped with a thin flexure section immediately outboard of the mast 208 to provide for flapping motion of the rotor blades. For yoke assembly 262 these sections are shown as 266 and 268.

FIG. 7

Figure 7:
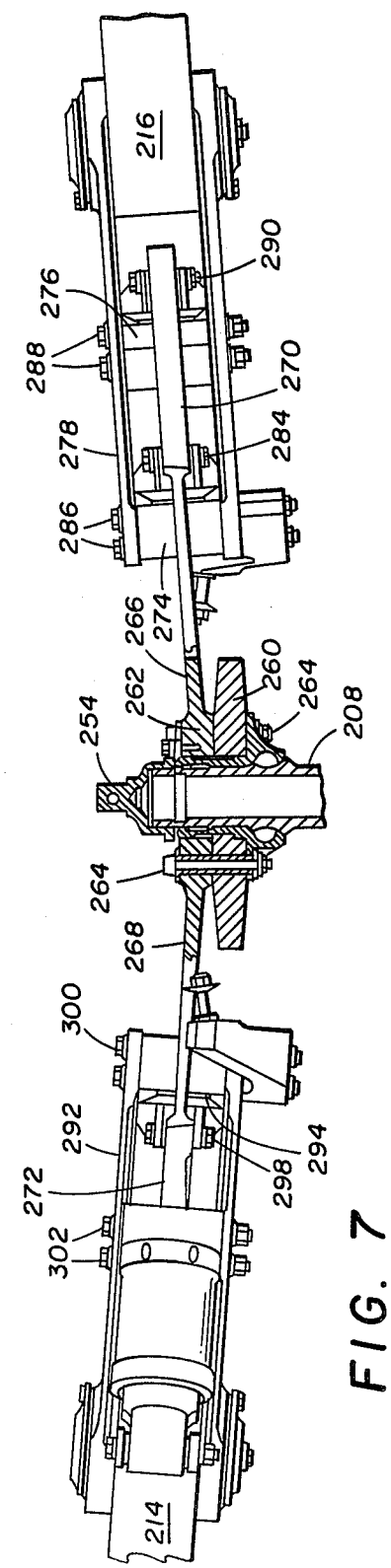
FIG. 7 is an elevation view, partially sectioned, of the rotor hub of the present invention.

The rotor hub of the present invention together with the upper end of mast 208 is shown in further detail in FIG. 7. Extending outboard from flexure sections 266 and 268, yoke assembly 262 has outboard plates 270 and 272. Elastomeric bearings 274 and 276 connect plate 270 to grip 278. The elastomeric bearings pass through apertures 280 and 282 (shown in FIG. 8) the apertures extending through the plate sections of yoke assembly 262. Elastomeric bearing 274 is secured to plate 270 by means of bolts 284 while the bearing is secured to grip 278 by bolts 286. Elastomeric bearing 276 is engaged to grip 278 by bolts 288 and to plates 270 by bolt 290.

Figure 8:
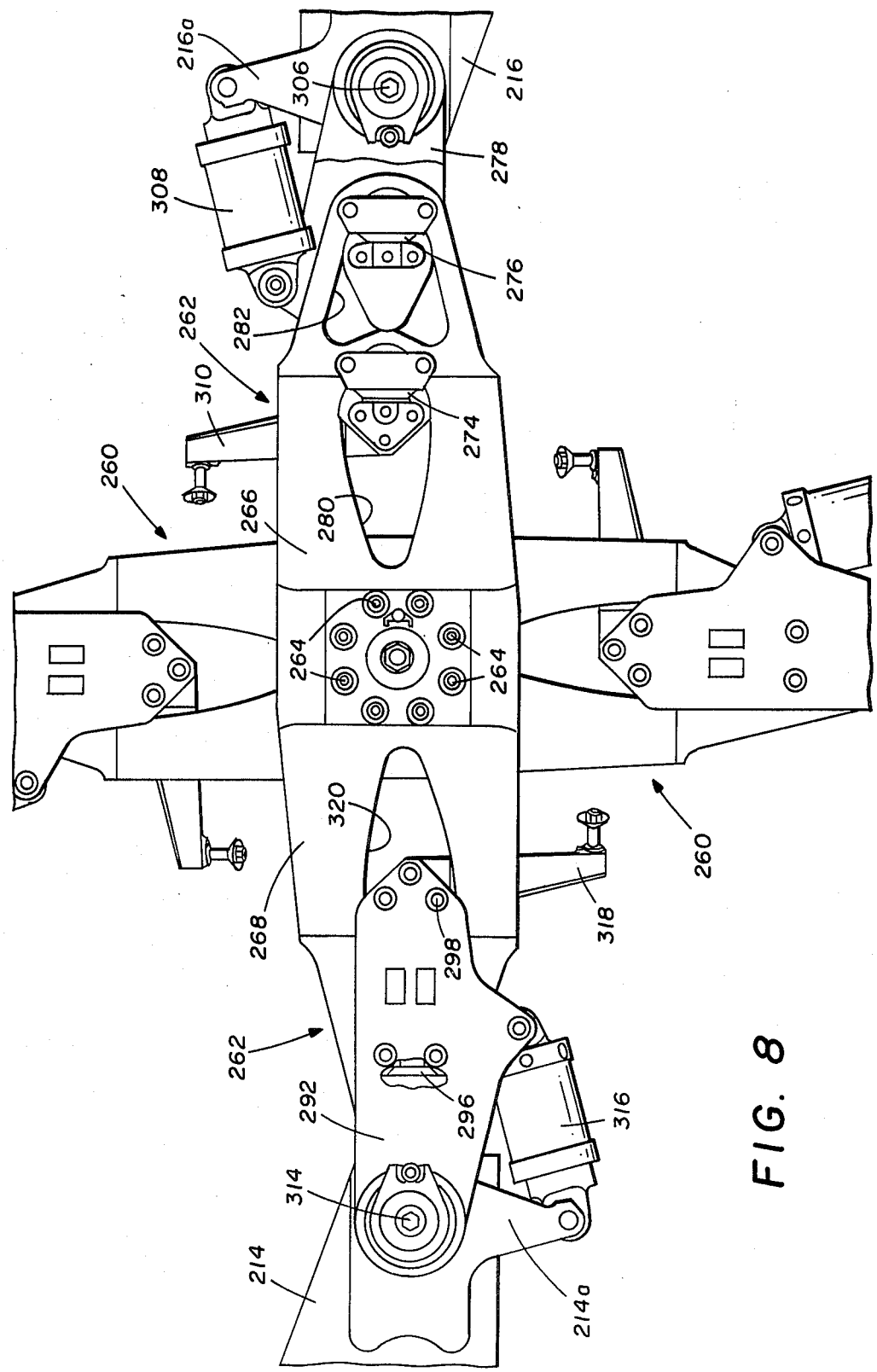
FIG. 8 is a plan view of a stacked yoke rotor hub of the present invention.

Plate 272 is likewise connected to grip 292 by elastomeric bearings 294 and 296 (see FIG. 8). Bearing 294 is connected to plate 272 by bolts 298 and to grip 292 by bolts 300. Bearing 296 is joined to grip 292 by bolts 302 and is further connected to plate 272 by bolts not shown.

FIG. 8

The yoke assembly illustrated in FIG. 7 is shown in plan view in FIG. 8. Grip 278 is joined to blade 216 by a blade bolt 306. Blade 216 includes an extension 216a that is connected by a bolt to an elastomeric spring-damper 308 which is connected at the opposite end thereof to grip 278. Damper 308 is provided to damp the lead-lag motion of blade 304 about blade bolt 306. A pitch horn 310 is bolted to grip 278. The pitch horn 310 is connected through linkage to a swash plate (not shown) for controlling the pitch angle of blade 216.

Grip 292 is connected to blade 214 by means of a blade bolt 314. A blade extension 214a connects the blade to an elastomeric spring-damper 316. The damper is connected between grip 292 and blade 214 to dampen the lead-lag motion of blade 214 as it pivots about blade bolt 314. A pitch horn 318 is bolted to grip 298 which extends through an aperture 320 to provide pitch control for blade 312.

Yoke assembly 260 is bolted to mast 208 at a right angle to yoke assembly 262 and immediately therebelow. Yoke assembly 260 is structurally the same as yoke assembly 262.

The operation of the helicopter drive train of the present invention will now be described in reference to FIGS. 5-8. As described above the rotor blades 214 and 216 are caused to undergo a flapping motion due to aerodynamic pressure and cyclic control forces. In accordance with the present invention the flapping motion of the blades is accommodated through a plurality of drive train units. The resilient transmission mounts 202 and 204 shown in FIG. 5 are equivalent to the transmission mounts 24 and 25 described above and shown in FIG. 1. These transmission mounts operate independently to permit the transmission 206 to tilt in any direction in reference to the at-rest vertical axis of mast 208. Note, however, that as stated above the transmission mounts 202 and 204 (24 and 25) include stops which limit the extent of travel thereof. The transmission mounts accommodate approximately 25% of the tip-path plane flapping deflection.

The second component which flexes to accommodate the flapping motion of the rotor is the mast 208. The mast is a tubular steel member which extends upward from the transmission. Mast 208 bends under the flapping force applied by the blades to accommodate approximately 20% of the flapping deflection.

The third element of the helicopter drive train is the hub 213 which comprises segments 210 and 212. The yoke assembly 262, which corresponds to hub 213, includes flexure sections 266 and 268 which bend to accommodate the flapping motion of the rotor. The hub flexure sections deflect to absorb approximately 50% of the flapping motion of the tip-path plane.

Finally the rotor blades 214 and 216 are designed to have beam-wise bending to accommodate approximately 5% of the total flapping motion.

The hub described above comprises identical yoke assemblies bolted together at right angles. Each of the yoke assemblies is fabricated essentially from a single plate which is machined to have the appropriate parameters. This procedure is less expensive as compared to the prior art procedure of casting and/or forging and machining a large, complex hub structure. Further, by being made of plate stock, maximum advantage can be made of the unidirectional strength of rolled plate material which in turn increases the hub fatigue strength. The use of identical yoke sections to fabricate the overall hub substantially reduces the machining and manufacturing costs as compared to a single unit hub. This is especially true for a four-bladed rotor. The identical yoke assemblies are bolted together to produce the complete hub. This manufacturing technique further reduces the shipping and storage expenses associated with the hub.

In each of the yoke assemblies the flexure sections are produced by machining the yoke to have a lesser thickness. The flexure section is placed inboard on the yoke close to the mast to reduce the flap hinge offset distance from the mast. Reducing the flap hinge offset distance improves the flight and vibrational characteristics of the helicopter. In a four-bladed rotor configuration using two stacked yokes, the flap hinge offset is substantially reduced by having overlapping flexure sections, a configuration which would be difficult, if not impossible, to produce for a single unit four-bladed hub.

The hub comprising yoke assemblies 260 and 262 along with the associated grips as shown in FIGS. 6-8 is for a four-bladed rotor system. However, the yoke assemblies of the present invention can easily be applied to produce a six-bladed rotor with the addition of one more yoke section.

Figure 9:
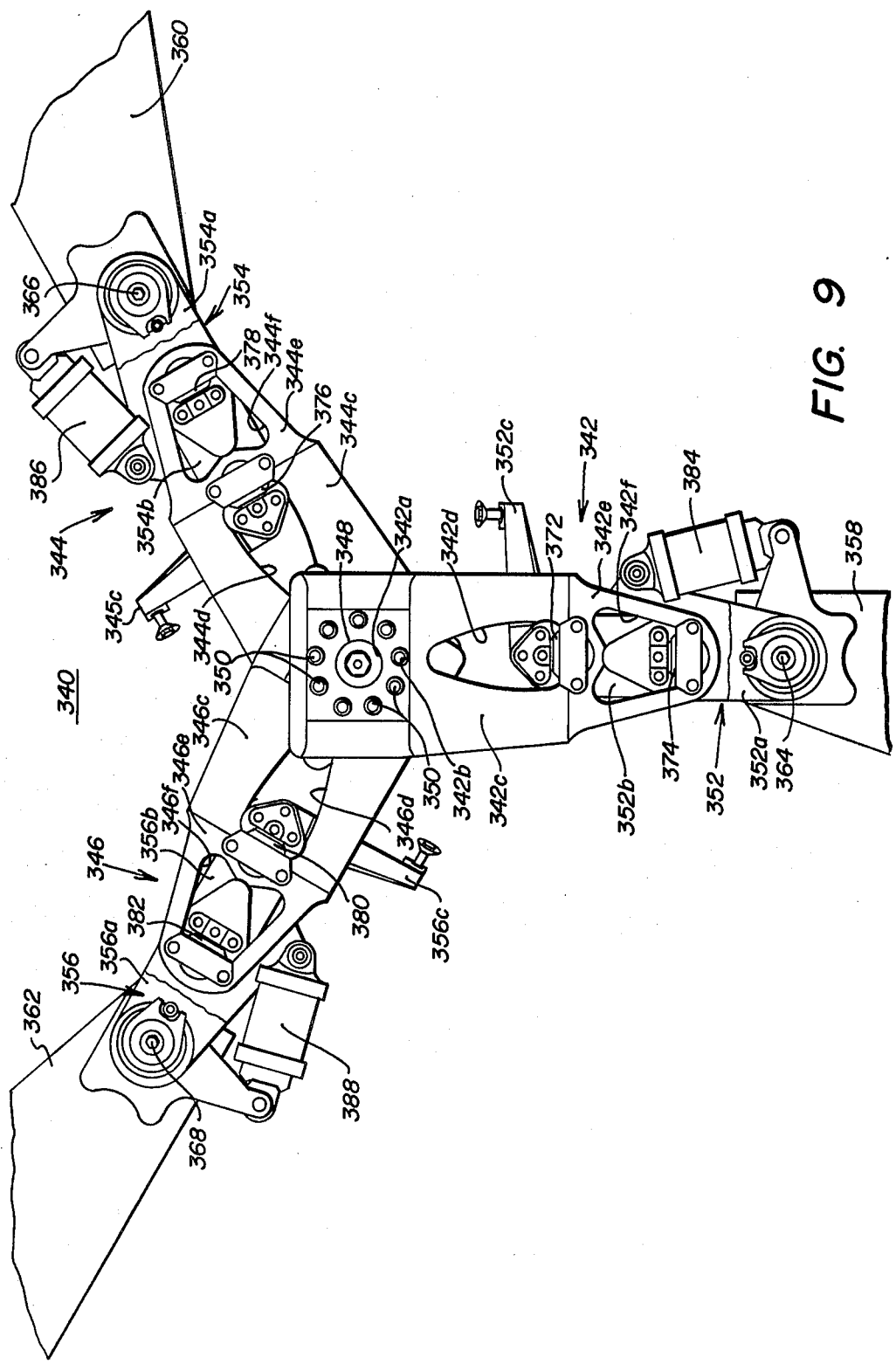
FIG. 9 is a plan view, partially cut away, of a three-bladed rotor hub of the present invention.

The hub of the present invention is not limited to double-ended embodiments as described above for supporting two blades but can also be manufactured in a single ended version to produce rotor systems having any number of rotor blades either odd or even. An example of this structure is shown in FIG. 9 which illustrates a three-bladed rotor hub 340. This rotor hub has three yokes 342-346, each of which is identical. The hubs are stacked axially on a mast 348. The three yokes are secured to each other by bolts 350. Nine such bolts 350 are shown such that the yokes 342-346 can be equally spaced about mast 348. Each of the yokes has a set of nine holes therein for receiving bolts 350.

The three yokes are identical and will be described in reference to yoke 342. The inboard end of yoke 342 is a plate section which has an opening 342a for receiving mast 348. A group of nine holes 342b are provided for receiving bolts 350. Extending outboard from the opening 342a the yoke 342 has a flexure section 342c which has a lesser thickness than the yoke in the other regions. Within the flexure section 342c there is formed an elongate aperature 342d.

Extending still further outboard from flexure section 342c, yoke 342 has section 342e which has a greater thickness than that of flexure section 342c. Included within section 342e is an aperture 342f.

The yokes 342-346 are provided with blade grips 352-356, respectively. The grips are in turn joined to blades 358-362 by means of blades bolts 364-368.

Each of the blade grips 352-356 is connected to the associated yoke by elastomeric bearings 372-382, respectively. Rotor hub 340 is further provided with dampers 384-388 connected between the blades and blade grip to damp the lead-lag motion of the rotor blades.

The structure of yoke 342, together with grip 352 and blade 358 will be described in detail as representative of all three yoke/grip/blade assemblies. Grip 352 comprises an upper plate 352a and a lower plate 352b disposed on either side of yoke 342. Elastomeric bearings 372 and 374 are connected to section 342e of yoke 342 as well as to both plates of grip 352. The grip 352 further includes a pitch horn 352c which is secured to plate 352b. The elastomeric bearings support the weight of the grip and blade and also carry the centrifugal forces generated by the blade when the blade is in operation. The bearings permit the pitch horn 352c to rotate the blade 358 about its pitch axis.

The three yokes 342-346 are structurally the same and are bolted together in a stacked arrangement to form the rotor hub 340. The rotor hub 340 as a unit is then secured to mast 348. The yokes 342-346 each support a single rotor blade as opposed to the previously described yokes which support a rotor blade at either end thereof. These yokes also have the advantages as described above in having reduced manufacturing cost and lesser expenses for storage and transportation. The maintenance expense of the hub of the present invention is further reduced since a single damaged yoke can be replaced rather than replacing the entire hub. In other regards, the single-ended yokes 342-346 function in the same manner as the double-ended yokes described above.

The drive train structure of the present invention serves to reduce the vibrations induced into the helicopter fuselage by blade flapping. By statically deflecting the transmission mounts and mast to aid in achieving the desired angular deflection of the blade tip-path plane, the amplitude of oscillatory movement of the rotor blades is substantially reduced. This lesser movement reduces the flapping moment forces which are transmitted to the fuselage and reduces the lead-lag motion of the rotor blades. The reduced lead-lag motion leads to a reduction in oscillatory shear forces which are transmitted through the hub to the fuselage. Therefore, the drive train structure of the present invention substantially reduces the vibrations which act on the helicopter fuselage.

When a plurality of hub sections are utilized to produce a multibladed rotor, it will be noted that the rotor blades operate in individual offset tip-path planes. The operation of the blades in differing planes has been demonstrated to be quite satisfactory and no detrimental effects have been noted.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

I claim:

1. A helicopter power train including a transmission for driving a multi-blade rotor for accommodating rotor tip-path plane flapping deflection comprising in combination:
    (a) a resilient mounting including a plurality of independently operating mounts with travel limits for coupling the transmission to the fuselage of the helicopter, said mounting to accommodate from about 15% to 35% of said deflection,
    (b) a flexible mast extending from said transmission to said rotor to accommodate from about 10% to 30% of said deflection,
    (c) a yoke secured to said mast for connecting said blades to said mast, said yoke having a thin flexure section immediately outboard of said mast to accommodate from about 40% to 60% of said deflection, and (d) each of said blades including means for providing beam bending to accommodate from 0% to about 10% of said deflection.

2. A helicopter power train as recited in claim 1 wherein said resilient mounting includes a load-bearing elastomeric member.

3. A helicopter power train as recited in claim 1 wherein said flexible mast comprises a tubular member extending from said transmission to support said yoke and drive said blades.

4. A helicopter power train including a transmission for driving a multi-blade rotor for accommodating rotor tip-path plane flapping deflection comprising in combination:

(a) a resilient mounting including a plurality of independently operating mounts with travel limits for coupling the transmission to the fuselage of the helicopter, said mounting to accommodate approximately 25% of said flapping deflection;

(b) a flexible mast extending from said transmission to said rotor to accommodate approximately 20% of said flapping deflection;

(c) a yoke secured to said mast for connecting said blades to said mast, said yoke having a thin flexure section immediately outboard of said mast to accommodate approximately 50% of said flapping deflection; and (d) each of said blades including means for providing beam bending to accommodate approximately 5% of said flapping deflection.

5. A helicopter drive train including a transmission for driving a multi-blade rotor where rotor flapping tilts the blade tip-path plane to an angular deflection with regard to the helicopter fuselage, the combination comprising:

(a) a resilient mounting including a plurality of independently operating mounts with travel limits for coupling the transmission to the helicopter fuselage, said mounting statically accommodating a pre-established percentage range of the total said angular deflection, (b) a mast extending from said transmission and having beamwise flexibility for statically accommodating a pre-established percentage range of the total said angular deflection;

(c) yoke structure secured to said mast for supporting said rotor blades and including a flexure segment immediately outboard of said mast for dynamically accommodating a part of said rotor flapping to accommodate a pre-established percentage range of the total said angular deflection, and (d) each of said blades including means for dynamically accommodating a part of said rotor flapping to accommodate a pre-established percentage range of the total said angular deflection.

* * * * *